United States Patent Office 3,456,786
Patented July 22, 1969

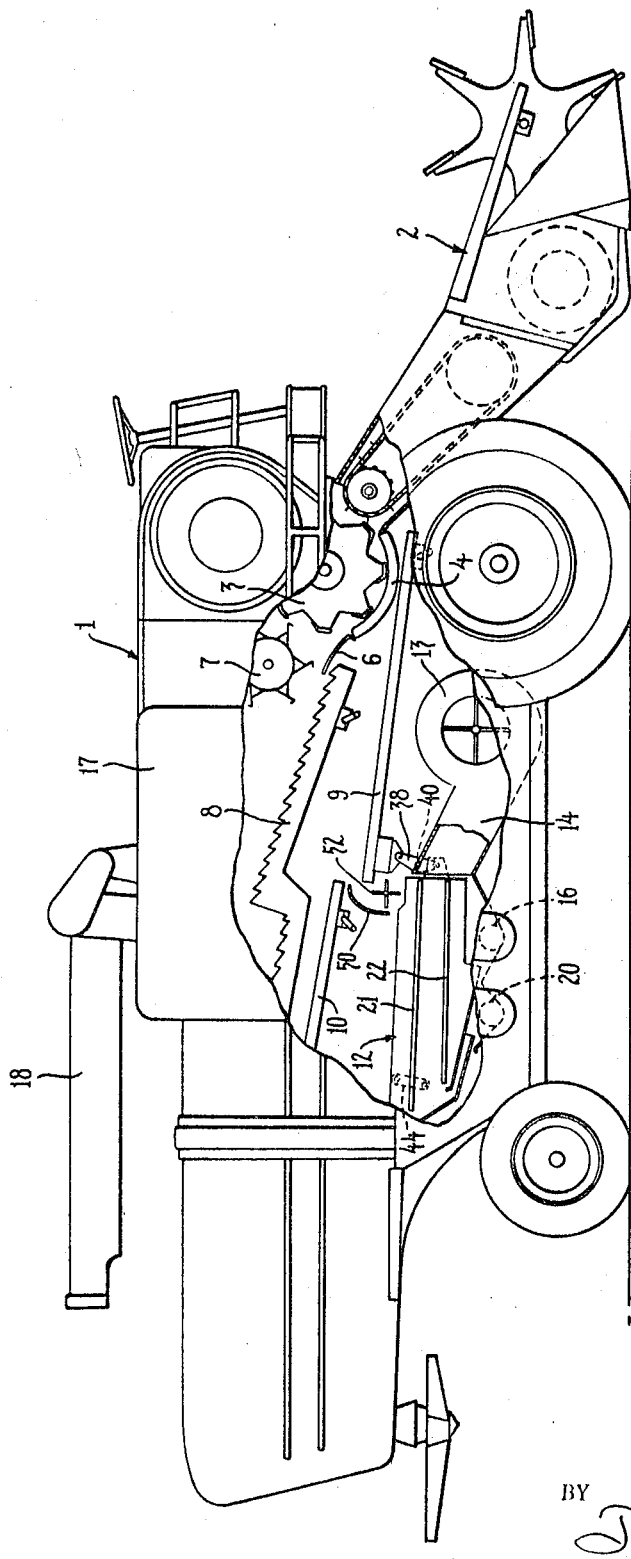

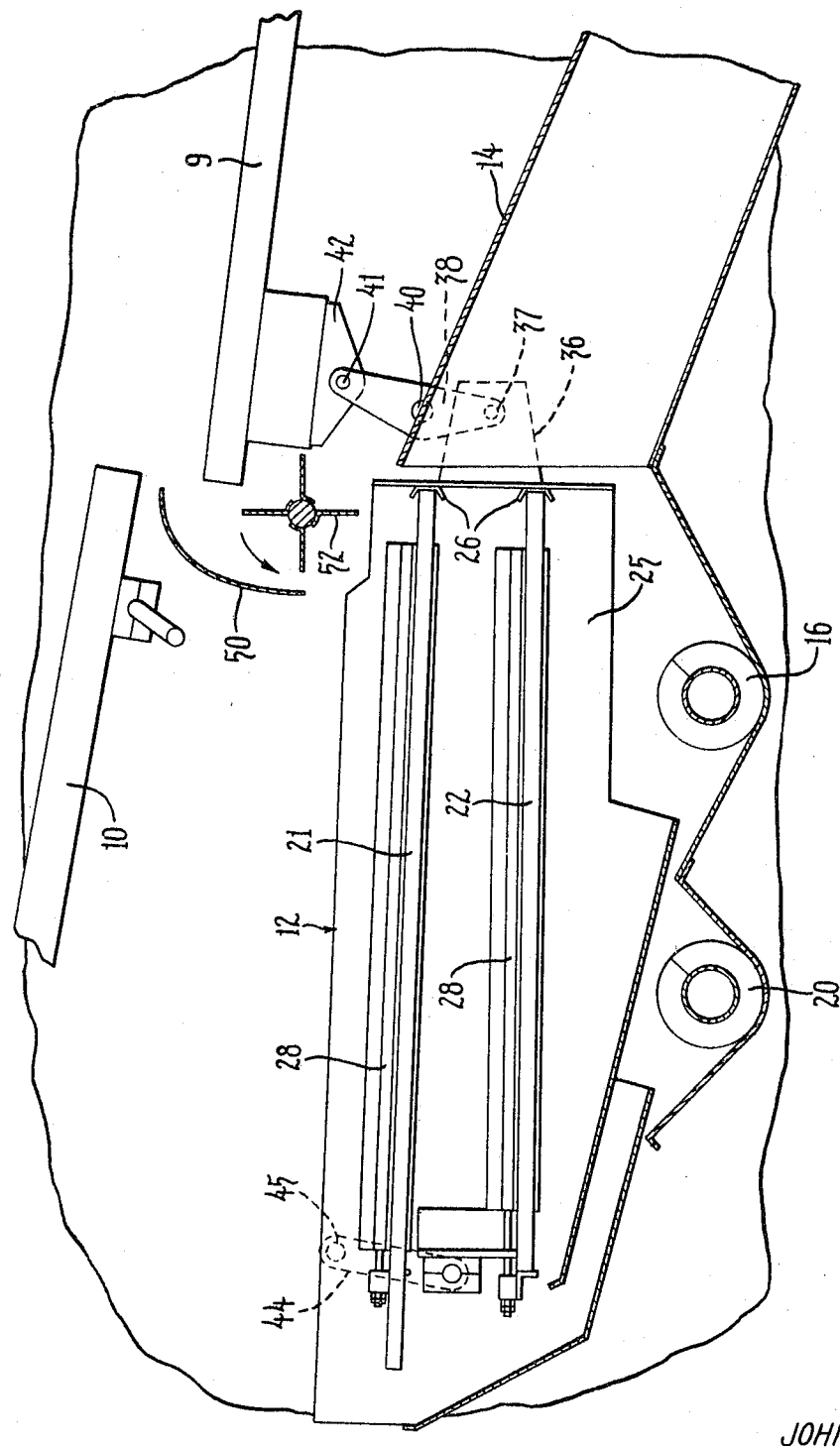

3,456,786
GRAIN SEPARATING APPARATUS
John H. A. Lee, Guelph, Ontario, Canada, assignor to Massey-Ferguson Limited, Toronto, Ontario, Canada
Filed June 6, 1967, Ser. No. 643,920
Int. Cl. B07b 4/00, 11/02, 9/00
U.S. Cl. 209—34                                 6 Claims

ABSTRACT OF THE DISCLOSURE

Grain separating apparatus for an agricultural combine having means for positively accelerating the mixture of grain and chaff from the conventional grain pan onto the shaker shoes such that the heavier grain is accelerated onto the shaker shoe screens and will resist higher velocity air for removing the chaff from the mixture.

Summary of the invention

Conventional cleaning shoes, or shaker shoes, of agricultural combines usually comprise a screen, or assembly of screens, which receives a mixture of grain, chaff and refuse from a vibrating grain pan or other conveyor. The shaker shoe screens are reciprocated rapidly in a fore and aft direction to facilitate the passage of grain through the screens. A blast of air is delivered from a fanning mill to both sides of the screen for the purpose of carrying the lighter chaff, straw particles and other refuse to the rear end of the combine for discharge.

The mixture of grain, chaff and refuse tends, however, to form into a mat on the shaker shoe screen which decreases, or prevents passage of the air from the fanning mill through the screens, and also prevents the grain from passing through the screen to the grain collecting troughs for delivery to the grain tanks. Consequently, incomplete separation occurs and part of the chaff and refuse may pass into the grain tanks. On the other hand, if the pressure of the fanning mill is increased, the lighter grain kernels may be blown out of the combine with the chaff and lost.

In accordance with the present invention, apparatus is provided for fluffing and propelling the mixture of grain, chaff and refuse onto the shaker shoe screens at a velocity such that the grain kernels will have sufficient inertia to resist a higher velocity stream of air from the fanning mill above the screen. The chaff and straw particles, being considerably lighter than the grain kernels, have less resistance to the higher velocity air stream, and are blown out of the combine by the fanning mill to obtain more complete cleaning of the grain, and to substantially increase the capacity of the shaker shoe.

The foregoing is accomplished by feeding the material from the delivery end of the grain pan or similar conveyor into a rotating beater enclosed in a hood or shroud. The walls of the hood deflect the material downwardly toward the shaker shoe and the beater imparts a high velocity to the material. The interaction between the beater blades and the hood both decreases the density of the material to break up any mat formed on the grain pan, and imparts momentum to the grain kernels in a direction generally transverse to the direction of the air stream. Consequently, the fanning mill can be driven at higher speeds to provide a higher velocity air stream without increasing grain loss.

Brief description of the drawings

FIG. 1 is an elevational view of an agricultural combine having a cleaning assembly embodying the invention;

FIG. 2 is an enlarged elevational view of the shaker shoe assembly with the grain accelerator.

With reference to FIG. 1, a self-propelled agricultural combine is designated generally by reference numeral 1 and includes a conventional header 2 including a harvesting reel, cutter bar, feed auger and elevator for cutting and transporting harvested crop material to the threshing assembly including a drum or cylinder 3 and a concave 4. The interaction between the cylinder 3 and concave 4 causes the major portion of the grain to be separated from the straw, the grain falling through the concave, and the remainder of the crop material passing onto a grate 6.

The crop material on grade 6 may be encountered by a rotary beater 7 where it is further agitated by the beater and slowed down to even out the flow of material as it passes onto the straw walkers 8. The straw walkers reciprocate vertically and rearwardly to agitate the crop material and advance it to the rear of the combine while at the same time further separating the grain from the straw, the grain falling through the straw walkers onto forward and rear grain pans 9 and 10, respectively, accompanied by chaff and small particles of straw and refuse.

The forward grain pan 9 receives grain from concave 4, grate 6, and the forward portion of the straw walkers and conveys the mixture of grain, chaff and straw particles toward the rear with a reciprocating motion. The rear grain pan 10 receives the grain and refuse particles falling from the rear of the straw walkers and conveys this mixture forwardly toward the delivery end of the forward grain pan 9.

From grain pan 9, the material is conveyed onto a shaker shoe assembly designated generally by reference numeral 12. The shaker shoe reciprocates the material horizontally to separate the heavier grain from the chaff, refuse and straw particles, and a fanning mill 13 directs a stream of air through a duct 14 to blow the lighter refuse material toward the discharge end of the combine. Clean grain passes through the shaker shoes into a trough where it is carried by a cross auger 16 into grain tanks 17 having an unloading auger 18. The tailings pass over the rear end of the cleaning shoe and are received in a trough having an auger 20 for conveying the tailings to the cylinder or straw walkers for rethreshing in a conventional manner.

The illustrated shaker shoe assembly 12 includes two screens or sieves 21 and 22 supported between the side walls 25 of the shaker shoe assembly (FIG. 2). Side walls 25 may be secured together by conventional structural members 26 extending transversely between the forward ends of the side walls. Screens 21 and 22 may be supported in slides or guide ways 28 which may be of the type shown in Ashton United States Patent 2,939,581.

Projecting forwardly from the shaker shoe assembly 12 is an arm 36 which is pivoted at 37 at one end of a rocker or lever 38 mounted on a shaft 40. The other end of lever 38 is pivoted at 41 to a bracket 42 depending from the lower side of the forward grain pan 9. Rocker 38 oscillates about shaft 40 to cause horizontal reciprocation of the grain pan and shaker shoe assembly. The rear portion of the shaker shoe assembly is supported on a link 44 having its upper end pivoted at 45 to the side walls 25 of the shaker shoe assembly.

As grain and chaff are delivered from the rear end of grain pan 9 onto the receiving end of the upper screen 21 of the shaker shoe assembly, the reciprocating motion of the shaker shoe assembly advances the material rearwardly, the grain passing through the screen into the auger trough for delivery to grain tank 17.

According to this invention, the material passing from the delivery end of grain pan 9 is encountered by a rotary beater 52 enclosed in a hood or shroud 50 and rotating in a counter-clockwise direction as shown by the arrow in FIG. 2. The beater to hood clearance is such that the mixture of material delivered from the grain pan is loosened up and propelled from the hood at high velocity and reduced density. The hood deflects the material toward the shaker shoe sieves, and the high velocity of the heavier grain kernels is sufficient to overcome the effects of the high velocity air stream and the grain passes through the sieves. However, since the inertia of the lightweight material is not significantly affected by the beater, the air stream from the fanning mill carries it out of the combine. As a result, the efficiency of the cleaning operation is substantially improved, and the capacity of the shaker shoe is significantly increased.

It will be apparent to those skilled in the art that the invention is not limited to the exact construction shown, but that various alterations in the construction and arrangement of parts can be made without departing from the scope and spirit of the invention.

I claim:

1. In a grain separating apparatus including a shaker shoe assembly having at least one separating screen, a conveyor having its discharge end disposed above the screen, means for delivering a mixture of crop material including grain kernels, chaff and other lightweight refuse particles to said conveyor, and a fanning mill for blowing air upwardly and rearwardly through the screen, the improvement comprising means mounted to the rear of the discharge end of the conveyor for directing the crop material toward the forward end of the top screen and means, mounted between the discharge end of the conveyor and the means for directing the crop material, for positively propelling the mixture of crop material from the discharge end of the conveyor to impart high velocity to the grain kernels to increase the resistance of the grain kernels to the air stream from the fanning mill and to thereby permit the fanning mill to be operated at higher speeds to blow the chaff and refuse particles away from the shaker shoe.

2. The construction claimed in claim 1 wherein the means for positively propelling the mixture of crop material comprises a rotary beater, and the means for directing the crop material comprises a hood at least partially enclosing the beater.

3. The construction claimed in claim 1 wherein the means for positively propelling the mixture of crop material comprises a beater with a plurality of radial blades and the means for directing the crop material comprises a hood at least partially enclosing the beater, the beater being rotatable about a substantially horizontal axis in a direction to carry material from the conveyor and against the hood for deflection toward the screen.

4. A combine harvester having a threshing cylinder and concave, straw walkers for receiving partially threshed crop material from the cylinder and concave, conveying means for receiving a mixture of grain kernels, chaff and other lightweight impurities from the straw walkers and threshing cylinder and concave, a shaker shoe having at least one screen beneath the discharge end of the conveying means, and a fanning mill for directing an airstream across the shaker shoe screen to blow the chaff and other lightweight impurities away from the shaker shoe while permitting the grain kernels to be separated through the screen characterized by having means for increasing the capacity and cleaning efficiency of the shaker shoe, said means comprising at least one member mounted to the rear of the discharge end of the conveyor for directing the crop material toward the forward end of the top separating screen and an apparatus mounted between the discharge end of the conveying means and the members for directing the crop material operable to engage the material discharged from the conveying means and loosen and propel the material toward the screen to impart high velocity to the grain kernels toward the screen thereby permitting the fanning mill to be operated at higher speeds to increase the velocity and pressure of the airstream without impeding the passage of the grain kernels through the sieve.

5. A combine harvester as defined in claim 4 wherein said apparatus to propel the material toward the screen includes a beater rotatable in a direction to propel the material from the conveying means, and the member for directing the crop material includes a hood at least partially enclosing the beater.

6. A combine harvester as claimed in claim 5, said beater has radial vanes and the clearance between the vanes and surface of the hood is such that the crop material is fluffed and its density is decreased as it passes through the beater and hood.

References Cited

UNITED STATES PATENTS

| | | | |
|---|---|---|---|
| 111,541 | 2/1871 | Hollihan | 209—254 X |
| 2,240,779 | 5/1941 | Hunt et al. | 209—318 |
| 2,395,163 | 2/1946 | Carroll | 209—318 |
| 2,939,581 | 6/1960 | Ashton | 209—318 |
| 3,043,427 | 7/1962 | Eisert | 209—318 X |
| 3,348,676 | 10/1967 | Karlsson et al. | 209—153 X |

TIM R. MILES, Primary Examiner

U.S. Cl. X.R.

209—136, 153, 254, 318